June 2, 1936.  L. D. BAX  2,042,820
PISTON RING
Filed March 19, 1935
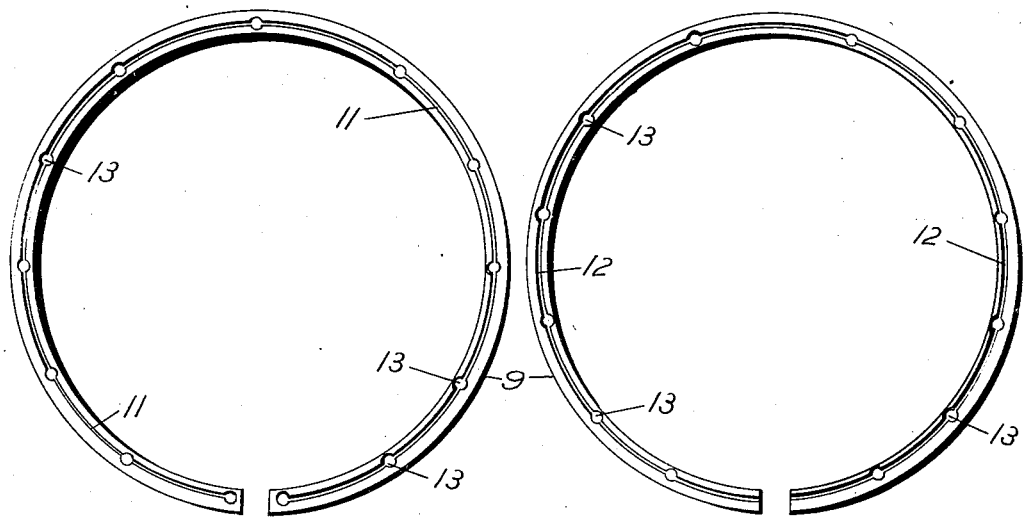
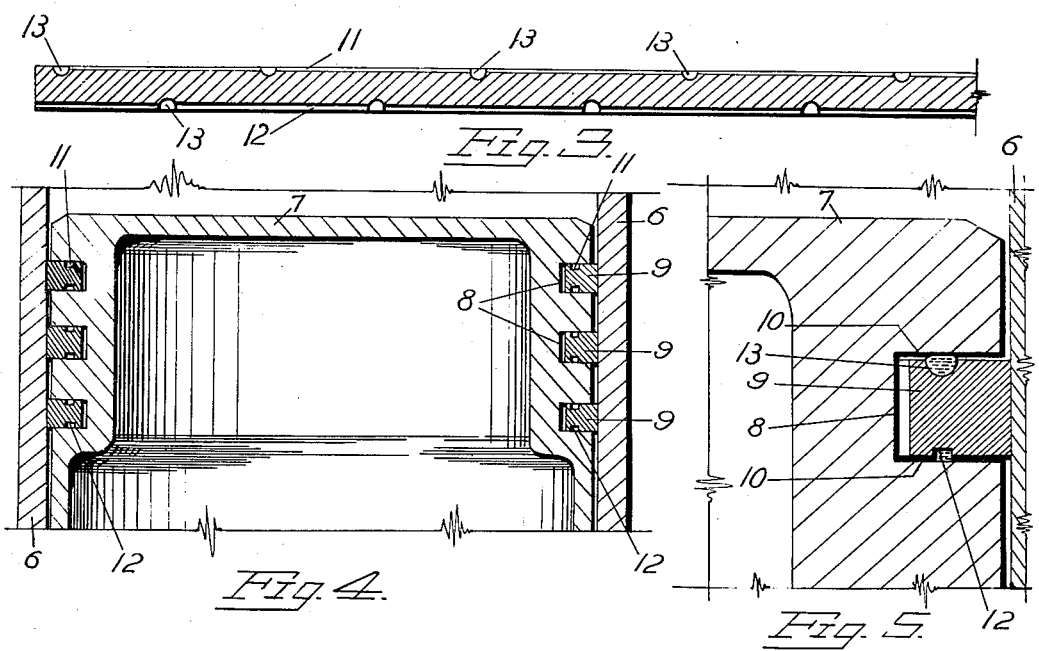
INVENTOR.
LIONEL D. BAX
BY
ATTORNEY.

Patented June 2, 1936

2,042,820

UNITED STATES PATENT OFFICE 2,042,820

PISTON RING

Lionel D. Bax, Denver, Colo.

Application March 19, 1935, Serial No. 11,823

5 Claims. (Cl. 309—31)

This invention relates to improvements in piston rings of the type employed in connection with engines and more particularly with internal combustion engines.

It is the object of this invention to produce a piston ring of such construction that the wear of the ring lands will be reduced to a minimum.

Another object is to produce a ring that will creep or rotate quite easily in its groove so as to distribute the oil evenly both along the ring lands and the cylinder surface.

A still further object of this invention is to produce a ring which forms an oil seal that retards the passage of gas between it and the ring lands, and thereby maintains a high compression in the engine.

The above and other objects that may appear as the description proceeds are attained by means of a construction that will now be described in detail and for this purpose, reference will be had to the accompanying drawing in which the ring has been illustrated and in which Figure 1 is a top plan view of the ring;

Figure 2 is a bottom plan view thereof;

Figure 3 is a longitudinal section along a medial plane, the section being a development and to a scale larger than the actual ring;

Figure 4 is a diametrical section through a piston and cylinder and shows the rings in place in the piston grooves; and Figure 5 is a fragmentary section showing the ring to a somewhat larger scale than in Figure 4.

In the drawing, numeral 6 represents the wall of the cylinder within which is located a piston 7. The piston is of the usual construction and is provided with a plurality of piston ring grooves 8 in each of which is located a piston ring 9. The upper and lower side walls of the grooves have been designated by reference numeral 10 and will be referred to as the ring lands.

The rings are of the proper size to fit the grooves and differ from the ordinary simple piston rings in this, that the top and the bottom surfaces are provided with grooves 11 and 12 respectively. These grooves are of substantially the same size and shape and have been designated by different numerals for convenience only. Positioned at spaced intervals along the grooves are pockets or depressions 13 which are somewhat larger in diameter than the width of the groove and somewhat deeper. The exact shape of these pockets is immaterial.

In Figure 2, the groove 12 has been shown as extending to the very ends of the ring so as to form a continuous groove when the ring is compressed until the ends come into contact. On the under surface of the ring (Figure 2) the first pocket at each end is spaced a short distance from the end of the ring.

In Figure 1 a pocket is located near each end of the ring and the groove 11 terminates in these pockets and does not form a continuous groove when the ends are brought together.

The ring is slightly thinner than the width of the groove so as to leave space for a film of oil.

When the engine is in operation, the cylinder wall is covered with a film of oil which is scraped along by the action of the ring as it moves. The variation of the pressure in the combustion chamber tends to force the oil into the piston ring groove and the grooves 11 and 12 soon fill with oil and form seals that are quite effective in preventing gases from passing from one side to the other. The pockets 13 also fill with oil and since the surface tension of the oil tends to give a drop a spherical shape the surface of the oil in the grooves will be transversely convex and the surface of the oil over each pocket will also be convex and slightly spherical. The action of the oil in the grooves and the pockets is to float the ring in centralized position in the groove and to keep the metal surfaces out of actual contact.

The ring, thus supported on the two oil cushions moves very freely and turns about the piston, a movement that is designated as creeping. This creeping movement helps to keep fresh oil in the grooves and thus prevent it from becoming gummy.

In the usual operation of an engine, the ring is forced against the top land of the ring groove on each down movement of the piston and against the bottom land on each up stroke and this action has a tendency to wear the lands and to increase the clearance between the ring and the bearing surface of the groove and thus produce leakage. With the present ring construction the same forces tending to move the ring are produced but the oil cushions formed by the oil in the grooves and the pockets seem to effectively keep the adjacent surfaces of the ring and groove apart and thus prevents wear. The pockets are very effective for producing the desired oil cushion and the top pockets are staggered with respect to those on the bottom surface of the ring as the metal would be weakened too much if the pockets were alined. The globules of oil in the pockets act somewhat like freely rotatable balls and serve both to center the ring in the groove and to permit it to move freely therein.

The superior lubricating action obtained by the use of this ring reduces the running temperature of the motor due to the reduced friction.

In Figure 1 the end pockets have been shown as spaced a sufficient distance from the ends of the ring to leave a solid wall, but if it is found desirable, the groove 11 can be extended to the ends of the ring as shown in Figure 2.

The grooves 11 and 12 are shown as located somewhat nearer to the inside of the ring than to the front and this removes the oil farther from the most highly heated surfaces and thereby saves it from the effects of the high temperatures, also to avoid possibility of the ring wearing down to the pockets.

The oil cushions formed between the top and bottom lands and the ring, by the oil in the grooves and supplemented by the oil in the pockets is the result of the combination shown, and produce a new sealing action as well as an anti-friction construction that greatly reduces the wear.

In the claims the top and bottom surfaces, shown in Figures 1 and 2 respectively, will be referred to as the sides, as distinguished from the curved vertical walls.

Having described the invention, what is claimed as new is:

1. A piston ring having at least one side thereof provided with an oil groove and with pockets spaced along the groove, the walls defining said groove and pockets terminating inwardly of the inner and outer peripheral faces of the ring.

2. A piston ring having both sides provided with an oil groove and with pockets spaced along the grooves, the walls defining said grooves and pockets terminating inwardly of the inner and outer peripheral faces of the ring.

3. A piston ring having both sides provided with oil grooves and with pockets spaced along the grooves, the pockets on one side being staggered with respect to the pockets on the opposite side, the walls defining said grooves and pockets terminating inwardly of the inner and outer peripheral faces of the ring.

4. A piston ring having both sides provided with oil grooves and with pockets spaced along the grooves, the walls defining said grooves and pockets terminating inwardly of the inner and outer peripheral faces of the ring, the grooves being disposed nearer to the inner wall of the ring than the outer.

5. A piston ring having both sides provided with oil grooves and with pockets, the walls defining said grooves and pockets terminating inwardly of the inner and outer peripheral faces of the ring, the pockets on one side being staggered with respect to the pockets on the opposite side, the grooves being disposed nearer to the inner wall of the ring than the outer.

LIONEL D. BAX.